United States Patent [19]

Gerholt et al.

[11] 3,992,237
[45] Nov. 16, 1976

[54] CONNECTIONS FOR INSULATED PIPES

[75] Inventors: Willem Gerholt, Hardenberg; Gerrit Heidemann, Oldenzaal, both of Netherlands

[73] Assignee: Industriele Onderneming Wavin N.V., Swolle, Netherlands

[22] Filed: Feb. 6, 1975

[21] Appl. No.: 547,644

Related U.S. Application Data

[63] Continuation of Ser. No. 300,935, Oct. 26, 1972, abandoned, which is a continuation-in-part of Ser. No. 33,227, April 30, 1970, Pat. No. 3,711,124.

[30] Foreign Application Priority Data

Feb. 12, 1970  Netherlands..................... 7002034

[52] U.S. Cl............................. 156/86; 156/187; 156/195; 156/244; 138/149; 138/150; 138/DIG. 9; 428/36; 428/315; 428/913
[51] Int. Cl.²................. B29C 27/00; B32B 31/00
[58] Field of Search ............... 156/78, 79, 86, 184, 156/187, 192, 244, 392, 428, 429, 188, 195; 138/149, 150, DIG. 9; 428/36, 310, 315, 913; 285/47, 351

[56] References Cited

UNITED STATES PATENTS

| 3,033,724 | 5/1962 | Stokes................................ 156/187 |
| 3,118,800 | 1/1964 | Snelling .............................. 156/79 |
| 3,240,645 | 3/1966 | Friedwald et al................... 156/429 |
| 3,273,600 | 9/1966 | Swan.................................. 138/149 |
| 3,289,703 | 12/1966 | Brown............................... 138/125 |
| 3,453,716 | 7/1969 | Cook ................................. 285/286 |
| 3,480,493 | 11/1969 | Bauer et al. ....................... 156/192 |
| 3,607,501 | 9/1971 | Okumura............................ 156/195 |
| 3,687,765 | 8/1972 | MacLean et al.................... 156/192 |

*Primary Examiner*—William J. Van Balen
*Attorney, Agent, or Firm*—Woodhams, Blanchard and Flynn

[57] ABSTRACT

A foam plastic layer is sprayed onto a metal pipe, whereafter a tape of polyethylene at the extrusion temperature is helically wound around the foam layer.

2 Claims, 4 Drawing Figures

CONNECTIONS FOR INSULATED PIPES

This application is a continuation of Ser. No. 300,935, filed Oct. 26, 1972, now abandoned, which in turn is a continuation-in-part of Ser. No. 33,227, filed Apr. 30, 1970, now U.S. Pat. No. 3,711,124.

BACKGROUND OF THE INVENTION

The invention relates to a pipe which is provided with an external foam plastic layer carrying a covering outer layer and a process of manufacturing same.

Pipes with a foam plastic insulation, mostly consisting of a metal pipe carrying a foam plastic layer on the outer surface and a covering outer layer are known. This covering layer may consist of thermoplastic material or thermosetting material. Such tubes present the disadvantage that the covering layer is not perfectly water tight and gas tight. An example of a covering layer which is not gas and water tight under extreme conditions such as on the bottom of a river, is a covering layer obtained by wrapping thermoplastic tape material helically or non-helically round the foam plastic layer whereby the overlapping portions of the tape are connected by glueing.

As the pipes are at present applied on a large scale for the transport of fluids of low temperature, e.g. liquefied hydrocarbons, over long distances absolutely reliable gas and water tight covering outer layers and connections are required. This holds the more so as loss of insulation might give rise to accidents by a sudden evaporation of the liquid gas.

SUMMARY OF THE INVENTION

It has now been found that the covering layer can be provided in a very simple way on the foam plastic layer, if according to the invention it consists of a tape of thermoplastic material which is wound around the outer side of the foam plastic layer and the cooperating parts of the individual windings are sealed preferably heatsealed to each other. Particularly advantageous is the step of connecting the edge of the overlapping part with the underlaying tape layer.

In order to ensure a perfectly water tight and gas tight sealing of the foam plastic layer round a pipe it is particularly advisable to wrap round the pipe, after the layer of foam plastic material has been provided by spraying, a warm tape of thermoplastic material, like polyethylene tape, while during the wrapping operation simultaneously the whole overlapping portions of such a tape are perfectly sealed on each other. In practice this can be very efficiently effected by wrapping around the pipe, insulated by applying foam plastic by spraying of a foamable plastic composition, a still warm polyethylene, polyvinylchloride, or polypropylene tape, which directly issues from an extruder, whereby due to the comparatively high temperatures and high heat contents at which the tape issues from the extruder, the overlapping parts of the polyethylene tape are completely heatsealed to each other, thereby forming a closed continuous covering layer.

The foam plastic layer is preferably applied by spraying a foamable plastic composition onto a rotated length of pipe. Preferably a polyurethane foam plastic resistant to temperatures over 120° C (EME 140 polyurethane foamable composition) is used in case of insulating pipe for transport of heated fluids.

DESCRIPTION OF PREFERRED EMBODIMENTS

Figure 1:
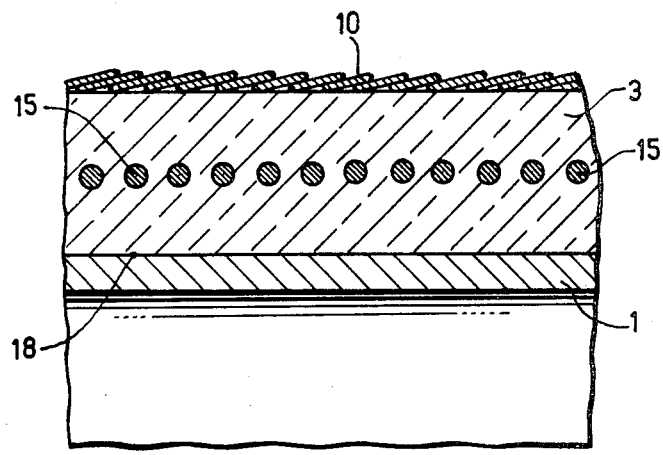
FIG. 1 represents a section of a part of a pipe provided with reinforced foam plastic insulation and a covering layer.

FIG. 1 shows part of a steel pipe 1, which is provided with a polyurethane foam plastic layer 3 and a covering layer 10. The polyurethane foam plastic layer is applied to the steel pipe by spraying a foamable polyurethane plastic composition onto the steel pipe which is rotated during this treatment. A foamable composition may consist of 100 parts of Desmophene, 25 parts of Freon 11, 4 parts of Desmorapid and 110 parts of Desmodur. Before applying the foamable composition the outer surface 18 of the steel tube 1 may be provided with a corrosion resistant coating, which is known per se.

In some cases it may be advisable to reinforce the foam plastic layer 3 by inserting reinforcing layers, e.g. glass tissue E 130, polyester tissue or even foil material such polyethylene foil. In this way any cracking of the foam provoked by expansion and shrinking of the steel tube will be limited by these reinforcing layers as a crack will stop after having reached a reinforcing layer.

By using a relatively coarse meshed tissue a good cohesion of the whole plastic foam layer 3 is secured. Although this cohesion may be partly or completely lost by using a polyethylene foil (of 0.05 mm thickness), the shrinking effect of the covering layer (either of thermoplastic or of thermosetting resin) will exert a compressive effect onto the foam plastic so that layers at both sides of such a foil are pressed onto each other.

The covering layer 10 is applied by wrapping an extruded polyethyleneband of a temperature of 160°–180° C around the foam layer 3.

As already indicated the overlapping portions are then completed heatsealed to each other, thereby forming a continuous moisture and gas tight covering layer 3 which shrinks around the foam plastic during cooling.

It is also possible to wrap thermoplastic tape material such as polypropylene around the foam plastic and connecting the overlapping parts particularly the free edge of the upper tape part and the underlaying tape winding by heatsealing or by means of a solvent dissolving the thermoplastic surface layer but in that case the shrinking effect will be relatively small and accordingly the thermoplastic material between two subsequent seals will not exert an even pressure on the foam plastic layer.

Figure 2:
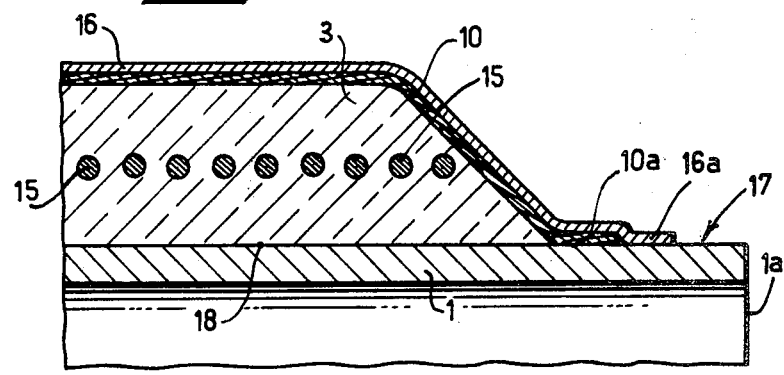
FIG. 2 represents an end section of a pipe provided with two covering layers.
Figure 3:
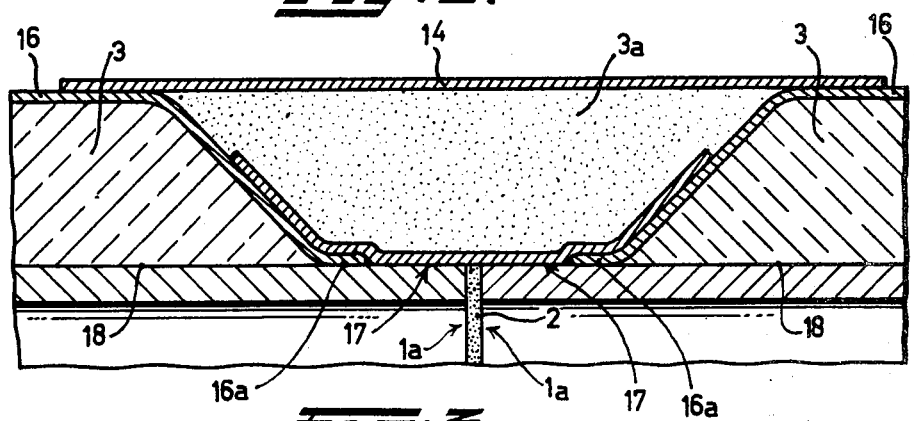
FIG. 3 represents a first embodiment of a connection of pipes provided with foam insulation and a covering layer.

As the separate steel pipes must be connected by welding an end part of the pipe is not provided with foam plastic. To prevent any penetration of moisture into the foam plastic layer during transport of the insulated pipe, a protective layer which cooperates sealingly with the free pipe end part 17 and with the covering layer 10 or 16 is present. This protective layer may be of the same material as the covering outer layer, as shown in FIGS. 2 and 3, where the protective layer corresponds to the slanting surface of layer 16 extending between the pipe surface and the outer diameter of the insulated pipe. The end part 10a of the protection layer terminates at some distance (e.g. 10–15 cm) from the pipe end 1a.

Figure 4:
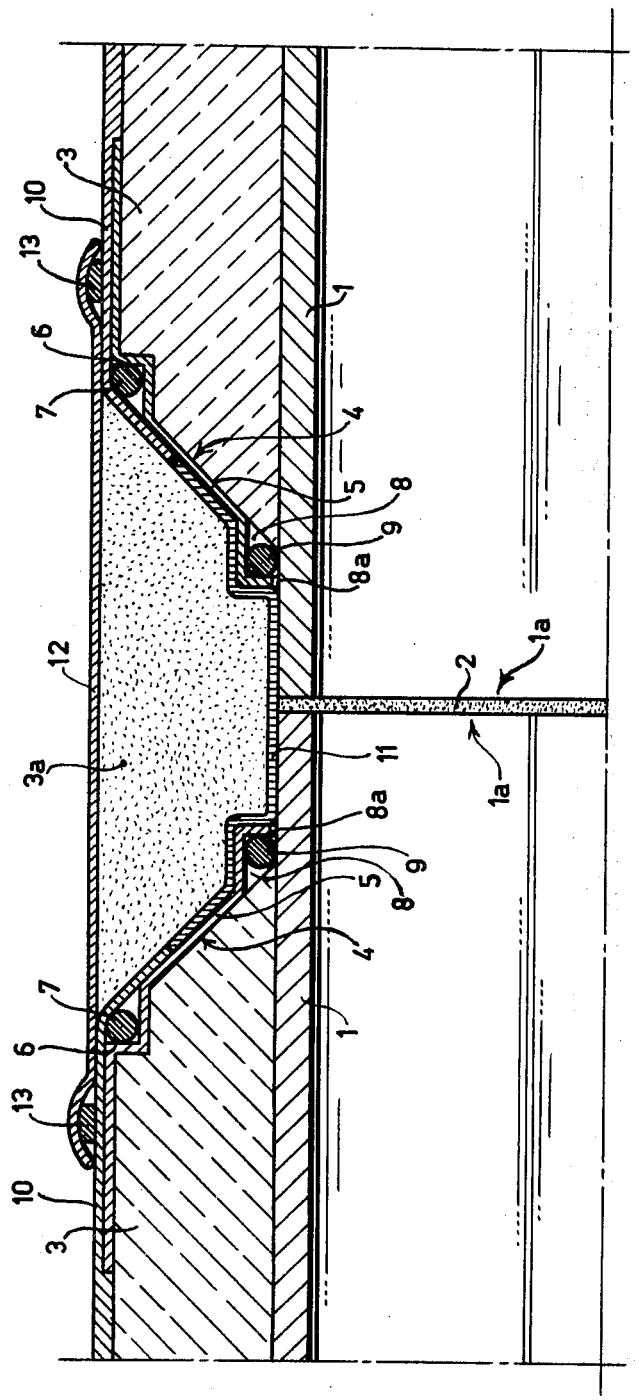
FIG. 4 represents another embodiment of a connection of pipes.

The protective layer may also consist of other material than the covering layer as shown in FIG. 4, where the protective layer consists of a hood 5 of fiber reinforced thermosetting (e.g. polyester) resin. This hood 5 cooperates tightly with the outer surface 18 of pipe end part 17 and with a thermoplastics covering layer 10.

The covering layer 10 may also consist of a tubular foil of thermoplastic material such as polyethylene which is pulled over the tube to be insulated. By choosing the inner diameter of the tubular foil greater than the outer diameter of the tube the space between the tubular foil and the tube to be insulated can be filled by expanding foam plastic. By heat treatment the tubular foil can be shrunk onto the steel tube.

The upper part of the covering layer may also consist of glass fibers, which after the insulating layer 3 has expanded, are wound around the foam plastic and thereupon coated with a thermosetting resin. The hardening of the reinforced resin layer can be promoted by admixing a catalyst. In this way (FIG. 2) an excellent covering tight layer 16 is obtained, the free end 16a of same cooperating with the steel surface end part 17. Due to the very good adherence of such fiber reinforced thermosetting resin layers to the steel surface penetration of moisture is excluded.

To combine the properties of hardness of fiber reinforced resin layers with the elastical properties of thermoplastic materials the foam layer may be provided with an outer fiber reinforced polyester covering outer layer 16 and an inner layer of thermoplastic material 10. Both layers cooperate with the end part 17 of steel pipe 1.

The inner layer 10 may also consist of a self curing rubber, such as a commercial butylrubber, which is applied by wrapping a tape of butylrubber around the foam plastic. Overlapping parts of the tape are connected by curing. It is advisable to use this layer together with a reinforced thermosetting resin layer e.g. polyester resin, epoxyresin, etc. but it can also be used with an outer layer of thermoplastics.

The thermoplastic or rubber layer 10 acts in these cases as vapour barrier.

A self curing rubber is particularly recommended in cases where an excellent adherence between the pipe surface and the vapour barrier is required.

Preferably a polyurethane foam plastic being resistant to temperatures over 120° C is used, such as EME 140.

FIG. 3 shows a first embodiment of a pipe connection of steel pipes provided with a foam insulation and a covering outer layer 16 of fiber reinforced thermosetting (e.g. polyester) resin.

The ends 1a of the pipes are connected by welding. To exclude any moisture penetration glass fibers may be wound from halfway the protective layer connecting the pipe surface end parts 17 and the cylindrical layer 16 and around the end parts 17. These fibers are impregnated with thermosetting polyester or epoxyresin. With or without said additional glass fiber reinforced thermosetting resin layer, two half cylindrical moulds are put around the free space between the two pipes 1, whereafter this space is filled with a polyurethane foam plastic 3a. After removal of the half moulds glass fibers are wound around the free polyurethane foam plastic surface and over a certain distance (e.g. 10 cm) around the covering layer 16.

The fibers are impregnated with polyester or epoxyresin together with a curing agent. After curing at ambient temperature a lining layer 14 is obtained.

According to another embodiment a tube or tubular foil of thermoplastic material 14 is slid over one of the insulated pipes before connecting two pipes by welding. After having filled the space 3a, the thermoplastic tube 14 is slid over the foam and shrunk onto the covering layers 16 of both tubes, thereby forming a thermoplastic lining layer 14.

It will be obvious that covering layer 16 may also consist of thermoplastics.

In FIG. 4 is represented another connection of two metal pipes 1 provided with a continuous urethane foam plastic layer and a covering layer of thermoplastic material. The ends 1a of the metal pipes are interconnected by a welded joint 2. It is obvious that instead of metal pipe 1 also plastic pipes can be used which are also interconnected by welding.

Provided around each pipe 1 is a polyurethane foam plastic insulating layer 3, while a covering layer 10 is provided around this foam plastic layer 3. This covering layer is formed by wrapping a warm polyethene tape of 170° C, issuing from the extruder around the foam plastic layer, whereby the overlapping portions of such a tape under the influence of the temperature and the plastic conditions of the polyethene are completely heatsealed to each other thereby forming a gas and water tight finishing layer.

A polyurethane foam plastic insulation 3a is provided between the two ends of the foam plastic layer on the two interconnected pipes, this insulation may likewise consist of polyurethane foam plastic, but it is obvious that also foam plastics can be applied different from those used for the foam plastic layer 3. This foam plastic insulating layer 3a is obtained (as already discribed) by expanding a foamable plastic composition in the space between the two ends of the foam plastic layers 3.

Before the pipes are interconnected by means of the welded joint 2 a ring of elastical material such as rubber 13 is provided on the outer side of each covering layer 10. A tubular piece made of polyvinylchloride, polyethylene or another thermoplastic material is slid over this ring, the inner diameter of this tubular piece 12 being greater than the outer diameter of the ring 13 after same has been provided on the covering layer 10. When a widened out tubular piece 12 is employed it will shrink due to heating to e.g. 160° C for polyvinylchloride and thereupon cooperate with the rings 13, whereby an absolutely gas- and water tight connection is obtained. Instead of a tubular piece 12 obviously also a tubular foil of thermoplastics 12 may be employed. This part 12 forms the lining layer.

In order to improve the connection it is advisable to level the ends of the foam plastic layer 3, whilst forming slanting walls 4 whereupon a protective layer in the shape of a hood 5, e.g. consisting of a fiber reinforced thermosetting synthetic resin such as polyester or epoxy resin is slid over the pipe the profile of this hood 5 being related to the profile of the inclined wall 4 and the profile of the foam plastic layer 3. The hood 5 is provided on the foam plastic layer 3 before the tape has been wrapped to the end. The tape 10 is wrapped as far as about halfway the inclined plane 4. A second ring 9 of elastical material, which clampingly cooperates with the sealing means 5 in the shape of the hood, is provided between the outer side of the metal or plastic pipe 1, and the side of the hood shaped sealing means 5 which is turned to the foam plastic layer 3 and the pipe 1, that is to say on the end 1a of the pipe 1 which is not covered with foam plastic.

In particular cases it may be advisable to wrap a layer of fibers 11 forming a finishing layer from halfway the inclined planes 4 and around the ends of the tubes 1 which are not covered with foam plastic and to impregnate these fibers with thermosetting polyester resin. In this way an additional sealing can be achieved, while moreover the hood 5 is clampingly pressed on the ring of elastical material 9 which cooperates with the outer side of the metal or plastic pipe 1.

The ring 9 can be advantageously accommodated in a first recess 8. In order to ensure a proper connection between the foam plastic layer 3 with the bevelled plane 4 and a correspondingly profiled hood 5, the latter is advantageously provided with a second recess 6 in the vicinity of the location whereat the outer side of the foam plastic layer 3 slants towards the outer side of the pipe; in this second recess 6 is disposed a third ring 7 of elastical material. The covering layer 10 is wrapped, after the provision of the hood 5 and after the ring has been located in position in the second recess, as far as halfway the inclined plane of the hood, 5. Due to shrinkage of the thermoplastic material on cooling the ring 7 will press the hood 5 against the foam plastic layer 3.

If a hood 5 with a recess 8 is applied preferably there will be a distance 8a between the outer side of the pipe 1 and the free end of the hood, after the provision of the ring 9 of elastical material, whereby a considerable pressure can be exerted on the ring 9.

Instead of glass fibers other reinforcing materials may be used.

What I claim is:

1. A method for manufacturing a composite insulated pipe, comprising the steps of:

providing a length of inner pipe;

forming a foamed plastic insulating layer on the outer surface of said pipe in surrounding relationship thereto with said foamed plastic layer terminating at a location spaced inwardly from the end of said pipe;

forming a tape of thermoplastic material in an extruder so that it is heated throughout to such a temperature as to allow heat sealing thereof;

discharging the formed tape from said extruder;

then spirally wrapping the heated tape around the foamed plastic layer prior to the tape as discharged from said extruder being cooled so that adjacent flights thereof overlap one another and become heat sealed together and so that the tape extends over the free outer surface of the pipe adjacent the end thereof; and permitting the tape to cool and shrink around the foamed plastic layer to form a continuous moisture and gastight covering therearound.

2. A method according to claim 1, including the step of discharging said tape from said extruder at a temperature within the range of between 160° and 180° C.

* * * * *